United States Patent
Book et al.

(10) Patent No.: US 9,913,488 B2
(45) Date of Patent: Mar. 13, 2018

(54) EGG PRODUCTS INCLUDING PLANT FIBER AND METHOD OF PREPARING SAME

(71) Applicant: CARGILL, INCORPORATED, Wayzata, MN (US)

(72) Inventors: Nali Marie Prchal Book, Corcoran, MN (US); Brenda K. Knapp-Polzin, Minneapolis, MN (US); Donald Andrew Moss, Elk River, MN (US); Robert Ralph Prochnow, Dellwood, MN (US); Brenda Lee Stepp, Saint Michael, MN (US)

(73) Assignee: Cargill, Incorporated, Wayzata, MN (US)

( * ) Notice: Subject to any disclaimer, the term of this patent is extended or adjusted under 35 U.S.C. 154(b) by 0 days.

(21) Appl. No.: 14/763,254

(22) PCT Filed: Feb. 6, 2014

(86) PCT No.: PCT/US2014/015037
§ 371 (c)(1),
(2) Date: Jul. 24, 2015

(87) PCT Pub. No.: WO2014/124101
PCT Pub. Date: Aug. 14, 2014

(65) Prior Publication Data
US 2015/0366256 A1 Dec. 24, 2015

Related U.S. Application Data

(60) Provisional application No. 61/791,400, filed on Feb. 6, 2013.

(51) Int. Cl.
A23L 1/32 (2006.01)
A23L 33/21 (2016.01)
A23L 15/00 (2016.01)

(52) U.S. Cl.
CPC ............ *A23L 1/3212* (2013.01); *A23L 15/20* (2016.08); *A23L 15/30* (2016.08); *A23L 33/21* (2016.08); *A23V 2002/00* (2013.01)

(58) Field of Classification Search
CPC .... A23L 1/3212; A23L 1/3055; A23L 1/3216; A23L 1/3204; A23L 1/3081; A23L 33/21; A23L 15/20; A23L 15/30; A23V 2002/00
See application file for complete search history.

(56) References Cited

U.S. PATENT DOCUMENTS

| | | |
|---|---|---|
| 4,169,162 A | 9/1979 | Appleman |
| 2003/0044509 A1 | 3/2003 | Roney et al. |
| 2003/0207004 A1 | 11/2003 | Theuer et al. |
| 2006/0003080 A1 | 1/2006 | Grusby |
| 2006/0121160 A1 | 6/2006 | Preppernau et al. |
| 2007/0275127 A1 | 11/2007 | Ball et al. |
| 2013/0022731 A1* | 1/2013 | Olson .................. A23L 1/3204 426/614 |

FOREIGN PATENT DOCUMENTS

| WO | WO2012/171001 A2 | 12/2012 |
|---|---|---|
| WO | 2014/124101 A1 | 8/2014 |

OTHER PUBLICATIONS

Jain. 2008. Yoga and Recreation. Last page of Yogic Diet chapter.*
Aberle. 2001. Principles of Meat Science. p. 144.*
PCT International Search Report PCT/US2014/015037, dated May 14, 2014. 1 page.

* cited by examiner

*Primary Examiner* — Anthony Weier

(57) ABSTRACT

Provided are compositions, and methods of making the same, including a liquid egg product and a plant fiber, where the plant fiber has at least one of a carrot fiber, an oat fiber, and a corn fiber.

18 Claims, No Drawings

EGG PRODUCTS INCLUDING PLANT FIBER AND METHOD OF PREPARING SAME

CROSS-REFERENCE TO RELATED APPLICATIONS

This application is a national phase application of international application PCT/US2014/015037, filed Feb. 6, 2014, which application claims priority to U.S. Provisional Patent Application No. 61/761,400, filed Feb. 6, 2013, which applications are hereby incorporated by reference herein in their entirety.

FIELD

This disclosure relates to compositions including egg and plant fiber and methods of preparing the same.

BACKGROUND

Improvements to food products can include, for example, improving the mouthfeel, flavor, look, and/or shelf-life of a product, reducing calories, and keeping raw material production costs low. To achieve these improvements in food products, food manufacturers may seek to use substitutes to traditional materials, which can impart improved qualities in a better or more efficient manner and/or can provide the same qualities at a reduced cost. At the same time, however, the appetizing nature and overall appearance of the food product should be maintained or even enhanced. Additionally, food manufacturers also seek ways to produce naturally-sourced and clean-label food products to satisfy increasing consumer demand for healthy and natural foods.

SUMMARY

In one aspect, provided is a composition comprising a liquid egg product and a plant fiber, where the plant fiber comprises at least one of a carrot fiber, an oat fiber, and a corn fiber. In some embodiments, the liquid egg product comprises liquid whole egg, liquid egg white, liquid egg yolk, or combinations thereof. In some embodiments, the plant fiber comprises a carrot fiber. In some embodiments, the carrot fiber has a water absorption capacity of at least 8 times its weight and comprises at least 70% total dietary fiber with at least 12% soluble dietary fiber. In some embodiments, the carrot fiber comprises about 0.001 wt % to about 2 wt % of the composition. In some embodiments, the plant fiber comprises a corn fiber. In some embodiments, the corn fiber comprises at least 90% of soluble dietary fiber. In some embodiments, the corn fiber comprises about 0.05 wt % to about 7 wt % of the composition. In some embodiments, the composition further comprises at least one of water, a starch, an oil, a flavoring, a dairy substance, a salt, an organic acid, a gum, and a coloring agent.

In another aspect, provided is a method of making an egg-based product, the method comprising combining a liquid egg product and a plant fiber to form a mixture, where the plant fiber comprises at least one of a carrot fiber, an oat fiber, and a corn fiber. In some embodiments, the liquid egg product comprises liquid whole egg, liquid egg white, liquid egg yolk, and combinations thereof. In some embodiments, the plant fiber comprises a carrot fiber. In some embodiments, the carrot fiber has a water absorption capacity of at least 8 times its weight and comprises at least 70% total dietary fiber with at least 12% soluble dietary fiber. In some embodiments, the carrot fiber comprises about 0.001 wt % to about 2 wt % of the mixture. In some embodiments, the plant fiber comprises a corn fiber. In some embodiments, the corn fiber comprises at least 90% of soluble dietary fiber. In some embodiments, the corn fiber comprises about 0.05 wt % to about 7 wt % of the mixture. In some embodiments, the method further comprises adding at least one of water, a starch, an oil, a flavoring, a dairy substance, a salt, an organic acid, a gum, and a coloring agent to the mixture. In some embodiments, the method further comprises heating the mixture. In some embodiments, heating the mixture comprises dispensing the mixture into a heated pan. In some embodiments, the pan is heated to about 175° F. to about 350° F. before the mixture is added. In some embodiments, heating the mixture comprises passing the mixture through a heated tube.

In another aspect, provided is an egg-based patty, comprising a liquid egg product and a plant fiber, where the plant fiber comprises at least one of a carrot fiber, an oat fiber, and a corn fiber.

In another aspect, provided is an egg-based extruded product, comprising a liquid egg product and a plant fiber, where the plant fiber comprises at least one of a carrot fiber, an oat fiber, and a corn fiber.

DETAILED DESCRIPTION

The present disclosure provides compositions including egg products and plant fibers. Methods of preparing the compositions are also disclosed. In some embodiments, the compositions may include carrot fibers, oat fibers, or corn fibers.

Egg Products

Egg products useful in embodiments of the present application may include whole egg, egg white, egg yolk, egg substitute, egg powder, and combinations thereof.

As used herein, the term "whole egg" means a mixture of egg white and yolk. The whole egg may, but does not necessarily, include egg white and egg yolk in a ratio recognized as the ratio of yolk to white in eggshells. Whole egg products can include other optional ingredients as described below.

As used herein, the term "egg white" means egg white obtained after separating the white and the yolk by breaking fresh eggs, and as such, the egg white is substantially free of egg yolk. The egg white can be used in the disclosed products that can comprise other optional ingredients as described below.

As used herein, the term "egg yolk" means egg yolk obtained after separating the white and the yolk by breaking fresh eggs, and as such, the egg yolk is substantially flee of egg white. The egg yolk can be used in the disclosed products that can comprise other optional ingredients as described below.

As used herein, the term "egg substitute" refers to egg substitute products, such as those available commercially under the trade name EGGBEATERS (ConAgra Foods, Inc., Omaha, Nebr., USA).

As used herein, the term "egg powder" refers to dehydrated whole egg, dehydrated egg white, dehydrated egg yolk, and combinations thereof. The term "reconstituted egg powder" refers to egg powder to which water has been added.

As used herein, the term "liquid egg product" means liquid whole egg, liquid egg white, liquid egg yolk, liquid egg substitute, reconstituted egg powder, or any combination of the above along with any other ingredients defined herein, but not limited to the ingredients listed below.

The disclosed liquid egg products used to produce egg products including plant fiber can be pasteurized with or without additional ingredients, mixed with additional ingredients, and heated to form various food products. The order of mixing and heating can be varied depending upon the desired egg product including plant fiber. In some embodiments, the liquid egg products used to produce egg products including plant fiber may be pasteurized before the addition of plant fiber. In some embodiments, the liquid egg products used to produce egg products including plant fiber may be pasteurized after the addition of plant fiber.

The liquid egg product used to produce egg products including plant fiber can be pasteurized in a manner consistent with the International Egg Pasteurization Manual (Froning, G. W., et. al, United Egg Association, Alpharetta, Ga., 2002), the disclosure of which is hereby incorporated by reference in its entirety. Typically, the liquid egg product can be pasteurized to reduce the number of viable microbes initially present in the liquid egg product.

Plant Fiber

As used herein, the terms "plant fiber" and "plant-sourced fiber" refer to an edible fiber (i.e., dietary fiber) obtained from a plant source, such as, for example, a fruit, a grain, a seed, or a vegetable.

Plant fiber useful in embodiments of the present disclosure may include, for example, plum fiber, berry fiber, banana fiber, apple fiber, citrus fiber (e.g., orange peel fiber) tomato fiber, pear fiber, corn fiber, sorghum fiber, millet fiber, wheat fiber, rice fiber, rye fiber, barley fiber, oat fiber, triticale fiber, wild rice fiber, teff fiber, canola seed fiber, rapeseed fiber, sunflower seed fiber, broccoli fiber, carrot fiber, Jerusalem artichoke fiber, green bean fiber, cauliflower fiber, zucchini fiber, celery fiber, nopal fiber, potato fiber, sweet potato fiber, parsnip fiber, turnip fiber, rutabaga fiber, sugar beet fiber, onion fiber, legume fiber (e.g., pea fiber, bean fiber, lupine fiber), and combinations thereof.

Plant fiber may include both soluble fiber and insoluble fiber, where soluble fiber is fiber that readily dissolves in or combines with water, typically forming a gel-like consistency in water, and where insoluble fiber is fiber that does not readily dissolve in water.

In some embodiments, the percentage of total dietary fiber present in carrot fiber samples may be measured by the Association of Official Analytical Chemists ("AOAC") Method 991.43, and the percentage of total dietary fiber present in corn fiber samples may be measured by the AOAC Method 2001.03.

In some embodiments, the percentage of soluble dietary fiber present in carrot fiber samples may be measured by the difference between the total dietary fiber (AOAC method 991.43) and the insoluble fiber (AOAC Method 991.43).

In some embodiments, the water binding capacity of carrot fibers may be measured using American Association of Cereal Chemists ("AACC") Method 56-20.

Liquid Egg Mixture Including Plant Fiber

A liquid egg mixture including plant fiber may be formed by combining a liquid egg product with a plant fiber.

In one embodiment, the liquid egg mixture including plant fiber may include liquid egg product and plant fiber, where the plant fiber may comprise about 0.001 wt % to about 7 wt %, about 0.05 wt % to about 5 wt %, about 0.001 wt % to about 2 wt %, about 0.0015 wt % to about 1.5 wt %, or about 0.002 wt % to about 1.0 wt % of the total mixture weight. In some embodiments, the plant fiber may comprise at least about 0.001 wt %, at least about 0.0015 wt %, or at least about 0.002 wt % of the total mixture weight. In some embodiments, the plant fiber may comprise less than about 7 wt %, less than about 5 wt %, less than about 3%, less than about 2 wt %, less than about 1.5 wt %, or less than about 1 wt % of the total mixture weight. In some embodiments, the plant fiber may be present in an amount of about 0.001 wt % to about 4 wt %, about 0.0015 wt % to about 3.5 wt %, or about 0.002 wt % to about 3 wt % of the liquid egg product weight. In some embodiments, the plant fiber may comprise at least about 0.001 wt %, at least about 0.0015 wt %, or at least about 0.002 wt % of the liquid egg product weight. In some embodiments, the plant fiber may comprise less than about 4 wt %, less than about 3.5 wt %, or less than about 1 wt % of the liquid egg product weight. In some embodiments, the liquid egg product may include whole eggs, egg whites, egg yolks, and combinations thereof. In some embodiments, the plant fiber may comprise a carrot fiber, an oat fiber, a corn fiber, or combinations thereof.

In some embodiments, the plant fiber may comprise a carrot fiber. In some embodiments, the carrot fiber may have a water absorption capacity of at least 10 times its weight, at least 12 times its weight, at least 14 times its weight, at least 16 times its weight, at least 18 times its weight, at least 20 times its weight, at least 22 times its weight, or at least 24 times its weight. In some embodiments, the carrot fiber may include at least 92% total dietary fiber and a range of about 12% to about 30% soluble dietary fiber. In some embodiments, the soluble dietary fiber is in the range of about 20 to about 25 weight percent, with the insoluble dietary fiber in the range of about 67% to about 85% by weight. In some embodiments, the carrot fiber may have a water absorption capacity of at least 8 times its weight, and may comprise at least 70% total dietary fiber with at least 12% soluble dietary fiber.

Carrot fiber suitable for use in applications of the present disclosure is described in U.S. Pat. No. 6,645,546 to Roney et al., the contents of which are hereby incorporated by reference in their entirety. Carrot fiber suitable for use in applications of the present disclosure is available commercially under the trade names HYDROBIND Carrot Fiber (LP) and HYDROBIND Carrot Fiber (SP), available from Wm. Bolthouse Farms Inc., Bakersfield, Calif., USA.

In one embodiment, the liquid egg mixture including carrot fiber includes liquid egg product and carrot fiber, where the carrot fiber may comprise about 0.001 wt % to about 2 wt %, about 0.0015 wt % to about 1.5 wt %, or about 0.002 wt % to about 1.0 wt % of the total mixture weight. In some embodiments, the carrot fiber may comprise at least about 0.001 wt %, at least about 0.0015 wt %, or at least about 0.002 wt % of the total mixture weight. In some embodiments, the carrot fiber may comprise less than about 2 wt %, less than about 1.5 wt %, or less than about 1 wt % of the total mixture weight. In some embodiments, the carrot fiber may be present in an amount of about 0.001 wt % to about 4 wt %, about 0.0015 wt % to about 3.5 wt %, or about 0.002 wt % to about 3 wt % of the liquid egg product weight. In some embodiments, the carrot fiber may comprise at least about 0.001 wt %, at least about 0.0015 wt %, or at least about 0.002 wt % of the liquid egg product weight. In some embodiments, the carrot fiber may comprise less than about 4 wt %, less than about 3.5 wt %, or less than about 1 wt % of the liquid egg product weight. In some embodiments, the liquid egg product may include whole eggs, egg whites, egg yolks, and combinations thereof.

In some embodiments, the plant fiber may comprise a corn fiber. In some embodiments, the corn fiber may be a resistant maltodextrin. Corn fiber suitable for use in applications of the present disclosure is available commercial under the trade names Fibersol®-2 (available from Archer Daniels Midland Co./Matsutani LLC) and Z-Trim corn fiber (available from Z Trim Ingredients). In some embodiments, the corn fiber may comprise 90% or more of dietary fiber in the form of water-soluble dietary fiber. Preferably, the corn fiber contains small amounts, if any, insoluble dietary fiber. In some embodiments, the soluble dietary fiber is both of high molecular weight (alcohol insoluble) and low molecular weight (alcohol soluble) indigestible carbohydrates.

In one embodiment, the liquid egg mixture including corn fiber includes liquid egg product and corn fiber, where the corn fiber may comprise about 0.05 wt % to about 7 wt %, about 0.2 wt % to about 5 wt % of the total mixture weight, or 0.2 wt % to about 3 wt % of the total mixture weight.

Incorporating plant fiber into the liquid egg mixture has many advantages. Generally, the use of plant fiber may improve the overall appearance and texture of the final egg-based product without interfering with the flavor, color, and aroma of the egg-based product. In one embodiment, the use of plant fiber improves the height, body, and structure of the egg-based product. In one embodiment, the plant fiber enhances the "fluffiness" of the egg-based product by absorbing excess water, causing the internal texture of the egg-product to have larger air cells. This fluffy texture adds more resilience to the bite.

Combining of the liquid egg product with the plant fiber may be accomplished by methods known to those of ordinary skill in the relevant arts, such as by, for example, mixing, folding, stirring, blending, or combinations thereof. In some embodiments, mixing of the liquid egg product with the plant fiber may be accomplished using a Model LDT 600 gallon mixer (Breddo Likwifier Division of Caravan Ingredients, Kansas City, Mo., USA).

Additives may be combined with the liquid egg mixture including plant fiber. Optional additives can include, for example, water, dairy substances (e.g., powdered milk), oil (e.g., soybean oil), various starches (e.g., corn/maize or tapioca starch), gums (e.g. xanthan gum, locust bean gum, gum arabic), hydrocolloids (e.g., carrageenan, pectin), proteins (e.g., soy flour protein, soy protein isolate, whey protein isolate), dried egg fractions (e.g., dried egg yolk, dried egg white), flavorants (e.g., pepper flavor, butter flavor, egg flavor), spices, salts (e.g., sodium chloride), organic acids (e.g., citric acid), and/or coloring agents (e.g., annatto).

In some embodiments, the liquid egg mixture including plant fiber and additives may include between about 40 wt % and 99 wt % whole egg, up to about 55 wt % water, up to about 4 wt % powdered whole milk, up to about 10 wt % soybean oil, up to about 4 wt % starch, up to about 2 wt % salt/spices, up to about 1 wt % xanthan gum, and up to about 1 wt % citric acid. In some embodiments, the plant fiber may comprise a carrot fiber, an oat fiber, a corn fiber, or combinations thereof. In some embodiments, the liquid egg mixture including fiber and additives may be heated to form an egg-based patty.

In some embodiments, the liquid egg mixture including plant fiber and additives may include between about 50 wt % and 99 wt % whole egg, up to about 45 wt % water, up to about 2 wt % powdered whole milk, up to about 3 wt % soybean oil, up to about 3 wt % starch, up to about 5 wt % soy flour protein, up to about 5 wt % soy protein isolate, up to about 5 wt % dried egg whites, up to about 0.5 wt % carrageenan, up to about 1 wt % salt, up to about 0.5 wt % xanthan gum, up to about 0.5 wt % locust bean gum, and up to about 0.5 wt % citric acid. In some embodiments, the plant fiber may comprise carrot fiber. In some embodiments, the liquid egg mixture including plant fiber and additives may be heated and extruded to form an egg-based extruded product.

In some embodiments, the liquid egg mixture including plant fiber and additives may include between about 63 wt % and 75 wt % whole egg, between about 15 wt % and 30 wt % water, up to about 3 wt % nonfat dried milk, up to about 3 wt % modified starch, up to about 3 wt % soybean oil, up to about 2 wt % spices, up to about 1 wt % citric acid, up to about 1 wt % xanthan gum. In some embodiments, the plant fiber may comprise corn fiber. In some embodiments, the liquid egg mixture including plant fiber and additives may be heated to form an egg-based patty or heated and extruded to form an egg-based extruded product.

A wide variety of suitable non-egg food materials may be combined with the liquid egg mixture including plant fiber prior to cooking, including, for example, various types of cheese (e.g., cheddar, Swiss, provolone), meats (e.g., bacon, ham, sausage), and vegetables (e.g., peppers, onions, potatoes).

Methods of Making Egg-Based Products Including Plant Fiber

In some embodiments, the liquid egg mixture including plant fiber may be used immediately after it is prepared to form an egg-based product including plant fiber. In some embodiments, the liquid egg mixture including plant fiber may be stored at room temperature for some length of time, refrigerated, and/or frozen before it is used to form an egg-based product including plant fiber. In some embodiments, refrigerated and/or frozen liquid egg mixture including plant fiber may be warmed to room temperature (e.g., about 25° C.) before it is used to form an egg-based product including plant fiber.

In some embodiments, the liquid egg mixture including plant fiber may be heated to provide an egg-based product, such as, for example, an egg-based patty or an egg-based extruded product. Methods of preparing egg-based products are known in the art and are described, for example, in U.S. Pat. No. 7,682,645 to Sanderson et al. and U.S. Patent Publication No. 2008/0063777 to Roberts et al., the disclosures of which are hereby incorporated by reference in their entirety.

In some embodiments, heating the liquid egg mixture including plant fiber may be accomplished by dispensing the mixture into a heated pan. In some embodiments, the pan is heated to about 175° F. to about 350° F. before the mixture is added.

In some embodiments, heating the liquid egg mixture including plant fiber may be accomplished by passing the mixture through a heated tube. This process may generally include the steps of a) initially heating the mixture to a temperature which is effective to heat the mixture and to prevent heat shock, but lower than a cooking temperature for the mixture, b) further heating the initially-heated mixture to provide a heated mixture having a temperature effective for causing the heated mixture to coagulate and cook, c) passing the heated mixture through at least one holding tube for an amount of time which is effective for forming a cooked egg product, d) stopping and starting the passage of the heated mixture as it passes through the holding tube, and e) extruding the heated mixture downstream from the holding tube to form an egg-based extruded product.

In another aspect, provided is an egg-based patty, comprising a liquid egg product and a plant fiber, where the plant fiber comprises at least one of a carrot fiber, an oat fiber, and a corn fiber.

In another aspect, provided is an egg-based extruded product, comprising a liquid egg product and a plant fiber, where the plant fiber comprises at least one of a carrot fiber, an oat fiber, and a corn fiber.

In some embodiments, the egg-based product may be an egg-based patty sandwiched between two bread or cooked batter layers (e.g., muffins, bread, croissant, bagel, or other suitable cooked batter layers). In some embodiments, these types of egg sandwiches may include other components, such as, for example, a melted cheese, a sauce, or other suitable components. In some embodiments, the egg-based patty may be a component of a completed food product, such as, for example, a breakfast wrap or burrito.

EXAMPLES

Aspects of certain embodiments in accordance with aspects of the disclosure are illustrated in the following Examples. The materials and methods described in these Examples are illustrative and not intended to be limiting.

Materials: nonfat dried milk (United Dairymen of Arizona, Tempe, Ariz., USA), HYDROBIND carrot fiber (LP) and HYDROBIND carrot fiber (SP) (Wm. Bolthouse Farms Inc., Bakersfield, Calif., USA), Z-TRIM corn fiber (Z-Trim Ingredients, Mundelein, Ill., USA), Fibersol-2 corn fiber (Archer Daniels Midland Co./Matsuni, LLC, Clinton, Iowa, USA), Z-TRIM oat fiber (Z-Trim Ingredients, Mundelein, Ill., USA), POLARTEX 06735 modified starch and POLARTEX 06738 modified starch (Cargill, Incorporated, Cedar Rapids, Iowa, USA), soybean oil (Cargill, Incorporated, Des Moines, Iowa, USA), liquid black pepper (McCormick & Co., Inc., Sparks, Md., USA), liquid butter flavor (Firmenich, New Ulm, Minn., USA), sodium chloride (Cargill, Incorporated, Hutchinson, Kans.), citric acid (Jungbunzlauer Canada Inc., Port Colborne, ON, Canada), xanthan gum (Jungbunzlauer Austria AG, Pernhofen, AUSTRIA), VISCOGUM FA locust bean gum (Cargill, Incorporated, Atlanta, Ga., USA), PROLIA defatted soy flour (Cargill, Incorporated, Cedar Rapids, Iowa, USA), AUBYGEL RPS carrageenan (Cargill, Incorporated, Atlanta, Ga., USA), SUPRO 120 IP soy protein isolate (Solae Company, St. Louis, Mo., USA), dried egg whites (Henningsen, Omaha, Nebr.) and annatto (CHR Hansen, Inc., Milwaukee, Wis., USA).

Example 1

Preparation of a Liquid Egg Product Mixture Including Carrot Fiber

An egg product mixture including carrot fiber is prepared with the ingredients detailed in Table 1.

TABLE 1

Liquid Egg Product Mixture Including Carrot Fiber Ingredients

| Ingredient | Ingredient (wt %) | Ingredient Amount (g) |
|---|---|---|
| Whole egg | 53.1800% | 1,206,101 |
| Water | 40.0000% | 907,184 |
| Nonfat dried milk | 2.0100% | 45,586 |
| HYDROBIND carrot fiber (LP) | 0.3600% | 8,164.656 |
| POLARTEX 06735 | 2.4600% | 55,791.82 |
| Soybean oil | 0.8600% | 19,504.46 |
| Liquid black pepper | 0.2500% | 5,669.9 |
| Liquid butter flavor | 0.2500% | 5,669.9 |
| Sodium chloride | 0.5000% | 11,339.8 |
| Citric acid | 0.0800% | 1,814.368 |
| Xanthan gum | 0.0400% | 907.184 |
| Annatto | 0.0100% | 226.796 |
| Total | 100.00% | 2,267,960 |

Whole egg (680,388 g) and water (907,184 g) are added to the mixing chamber of a Model LDT 600 gallon mixer (Breddo Likwifier Division of Caravan Ingredients, Kansas City, Mo., USA).

Nonfat dried milk (45,586 g), HYDROBIND carrot fiber (LP) (8,164.656 g), POLARTEX 06735 (55,791.82 g), soybean oil (19,504.46 g), liquid black pepper (5,669.9 g), liquid butter flavor (5,669.9 g), sodium chloride (11,339.8 g), citric acid (1,814.368 g), xanthan gum (907.184 g), and annatto (226.796 g) are combined in a container. The combined ingredients are added with stirring to the whole egg/water mixture.

The remaining quantity of whole egg is then added to the mixture, which is stirred for about 1 minute to form the egg product mixture including carrot fiber. The egg product mixture may be used immediately to prepare an egg-based product or may be refrigerated and/or frozen for later use.

Example 2

Preparation of a Liquid Egg Product Mixture Including Carrot Fiber

An egg product mixture including carrot fiber is prepared with the ingredients detailed in Table 2.

TABLE 2

Liquid Egg Product Mixture Including Carrot Fiber Ingredients

| Ingredient | Ingredient (wt %) | Ingredient Amount (g) |
|---|---|---|
| Whole egg | 63.0800% | 1,430,629 |
| Water | 30.0000% | 721,211.3 |
| Nonfat dried milk | 2.6000% | 58,966.96 |
| HYDROBIND carrot fiber (SP) | 0.1000% | 2,267.96 |
| POLARTEX 06735 | 2.5000% | 56,699 |
| Soybean oil | 1.0000% | 22,679.6 |
| Liquid black pepper | 0.2500% | 5,669.9 |
| Liquid butter flavor | 0.2500% | 5,669.9 |
| Sodium chloride | 0.20% | 4,535.92 |

TABLE 2-continued

Liquid Egg Product Mixture Including Carrot Fiber Ingredients

| Ingredient | Ingredient (wt %) | Ingredient Amount (g) |
|---|---|---|
| Citric acid | 0.0800% | 1,814.368 |
| Xanthan gum | 0.0400% | 907.184 |
| Total | 100.00% | 2,267,960 |

Whole egg (801,152.24 g) and water (721,211.3 g) are added to the mixing chamber of a Model LDT 600 gallon mixer (Breddo Likwifier Division of Caravan Ingredients, Kansas City, Mo., USA).

Nonfat dried milk (58,966.96 g), HYDROBIND carrot fiber (SP) (2,267.96 g), POLARTEX 06735 (56,699 g), soybean oil (22,679.6 g), liquid black pepper (5,669.9 g), liquid butter flavor (5,669.9 g), sodium chloride (4,535.92 g), citric acid (1,814.368 g), and xanthan gum (907.184 g) are combined in a container. The combined ingredients are added with stirring to the whole egg/water mixture.

The remaining quantity of whole egg is then added to the mixture, which is stirred for about 1 minute to form the egg product mixture including carrot fiber. The egg product mixture may be used immediately to prepare an egg-based product or may be refrigerated and/or frozen for later use.

Example 3

Preparation of a Liquid Egg Product Mixture Including Oat Fiber

An egg product mixture including oat fiber is prepared with the ingredients detailed in Table 3.

TABLE 3

Liquid Egg Product Mixture Including Oat Fiber Ingredients

| Ingredient | Ingredient (wt %) | Ingredient Amount (g) |
|---|---|---|
| Whole egg | 53.0000% | 1,202,019 |
| Water | 40.0000% | 907,184 |
| Nonfat dried milk | 2.6000% | 58,966.96 |
| Z-TRIM oat fiber | 0.08% | 1,814.368 |
| POLARTEX 06735 | 2.5000% | 56,699 |
| Soybean oil | 1.0000% | 22,679.6 |
| Liquid black pepper | 0.2500% | 5,669.9 |
| Liquid butter flavor | 0.2500% | 5,669.9 |
| Sodium chloride | 0.5000% | 11,339.8 |
| Citric acid | 0.0800% | 1,814.368 |
| Xanthan gum | 0.0400% | 907.184 |
| Total | 100.00% | 2,267,960 |

Whole egg (673,131 g) and water (907,184 g) are added to the mixing chamber of a Model LDT 600 gallon mixer (Breddo Likwifier Division of Caravan Ingredients, Kansas City, Mo., USA).

Nonfat dried milk (58,966.96 g), Z-TRIM oat fiber (1,814.368 g), POLARTEX 06735 (56,699 g), soybean oil (22,679.6 g), liquid black pepper (5,669.9 g), liquid butter flavor (5,669.9 g), sodium chloride (11,339.8 g), citric acid (1,814.368 g), and xanthan gum (907.184 g) are combined in a container. The combined ingredients are added with stirring to the whole egg/water mixture.

The remaining quantity of whole egg is then added to the mixture, which is stirred for about 1 minute to form the egg product mixture including oat fiber. The egg product mixture may be used immediately to prepare an egg-based product or may be refrigerated and/or frozen for later use.

Example 4

Preparation of a Liquid Egg Product Mixture Including Corn Fiber

An egg product mixture including corn fiber is prepared with the ingredients detailed in Table 4.

TABLE 4

Liquid Egg Product Mixture Including Corn Fiber Ingredients

| Ingredient | Ingredient (wt %) | Ingredient Amount (g) |
|---|---|---|
| Whole egg | 53.0000% | 1,202,019 |
| Water | 40.0000% | 907,184 |
| Nonfat dried milk | 2.6000% | 58,966.96 |
| Z-TRIM corn fiber | 0.08% | 1,814.368 |
| POLARTEX 06735 | 2.5000% | 56,699 |
| Soybean oil | 1.0000% | 22,679.6 |
| Liquid black pepper | 0.2500% | 5,669.9 |
| Liquid butter flavor | 0.2500% | 5,669.9 |
| Sodium chloride | 0.5000% | 11,339.8 |
| Citric acid | 0.0800% | 1,814.368 |
| Xanthan gum | 0.0400% | 907.184 |
| Total | 100.00% | 2,267,960 |

Whole egg (673,131 g) and water (907,184 g) are added to the mixing chamber of a Model LDT 600 gallon mixer (Breddo Likwifier Division of Caravan Ingredients, Kansas City, Mo., USA).

Nonfat dried milk (58,966.96 g), Z-TRIM corn fiber (1,814.368 g), POLARTEX 06735 (56,699 g), soybean oil (22,679.6 g), liquid black pepper (5,669.9 g), liquid butter flavor (5,669.9 g), sodium chloride (11,339.8 g), citric acid (1,814.368 g), and xanthan gum (907.184 g) are combined in a container. The combined ingredients are added with stirring to the whole egg/water mixture.

The remaining quantity of whole egg is then added to the mixture, which is stirred for about 1 minute to form the egg product mixture including corn fiber. The egg product mixture may be used immediately to prepare an egg-based product or may be refrigerated and/or frozen for later use.

Example 5

Preparation of an Egg-Based Patty Including Plant Fiber

Egg patty pans are coated with DH-135 LM oil (Cargill, Incorporated, Des Moines, Iowa, USA) and are heated to about 175° F. to about 350° F. (79° C. to about 177° C.). Egg product mixture including plant fiber, prepared as described in Examples 1-4, is dispensed into the heated pans and is cooked to a minimum temperature of 160° F. (71° C.) to form a cooked egg patty including plant fiber. The cooked egg patty including plant fiber is removed from the pan.

Example 6

Egg-Based Patty Including Plant Fiber Freezing/Cooling Process

The cooked egg patty including plant fiber, prepared as described in Example 5, may be placed in a mechanical freezer and cooled to about −20° F. to about 30° F. (−29° C. to about −1° C.) for about 15 to about 45 minutes before being packaged for storage and/or distribution.

Example 7

Sensory Testing of Cooked Egg-Based Patty Including Carrot Fiber

A sensory evaluation was completed to compare an egg-based patty prepared with carrot fiber according to Example 1 to a control egg-based patty made by the same method but using a liquid egg product mixture that does not include carrot fiber (Table 5).

TABLE 5

Control Liquid Egg Product Mixture

| Ingredient | Ingredient (wt %) | Ingredient Amount (g) |
|---|---|---|
| Whole egg | 63.08% | 1,430,629.168 |
| Water | 30.0000% | 680,388 |
| Nonfat dried milk | 2.6000% | 58,966.96 |
| POLARTEX 06735 | 2.5000% | 56,699 |
| Soybean oil | 1.0000% | 22,679.6 |
| Liquid black pepper | 0.2500% | 5,669.9 |
| Liquid butter flavor | 0.2500% | 5,669.9 |
| Sodium chloride | 0.2000% | 4,535.92 |
| Citric acid | 0.0800% | 1,814.368 |
| Xanthan gum | 0.0400% | 907.184 |
| Total | 100.00% | 2,267,960 |

An informal panel (n=13) sampled the control egg-based patty and the egg-based patty including carrot fiber; observations are summarized in Table 6.

TABLE 6

Sensory Testing Results

| Attribute | Table 5 Control Formula Egg-Based Patty | Table 1 Egg-Based Patty with Carrot Fiber |
|---|---|---|
| Texture | Wet, mushy, airy, open structure, soft | Open, clean, no excess water, least moist |
| Flavor | Mild egg flavor | Balanced flavor, slightly bland, mild egg flavor, best flavor |
| Appearance | Acceptable color, cell/air structure visible, fluffy* | Acceptable color, fluffy* |

*Half of the panelists thought that the control patty had the fluffiest texture; the other half thought that the egg-based patty with carrot fiber had the fluffiest texture.

The product with added carrot fiber had a desirable texture and noticeably less water release upon thawing and reheating. The patties including carrot fiber in their formula exhibited a higher level of water control, helping mitigate the wet, weepy texture typically associated with egg products containing the same amount of added water but without carrot fiber added.

Example 8

Sensory Testing of Cooked Egg-Based Patty Including Corn Fiber

An egg product mixture including corn fiber is prepared with the ingredients detailed in Table 7.

TABLE 7

Control Liquid Egg Product Mixture

| Ingredient | Ingredient wt % Range |
|---|---|
| Whole egg | 63-75% |
| Water | 15-30% |
| Nonfat dried milk | 0-3% |
| POLARTEX 06735 | 0-3% |
| Soybean oil | 0-3% |
| Spices | 0-2% |
| Citric acid | 0-1% |
| Xanthan gum | 0-1% |
| Fibersol-2 Soluble Corn Fiber | 0.2-7% |

About a half of the amount of whole egg and water are added to the mixing chamber of a Model LDT 600 gallon mixer (Breddo Likwifier Division of Caravan Ingredients, Kansas City, Mo., USA).

Nonfat dried milk, Fibersol-2 Soluble Corn Fiber, POLARTEX 06735, soybean oil, spices, citric acid, and xanthan gum are combined in a container. The combined ingredients are added with stirring to the whole egg/water mixture.

The remaining quantity of whole egg is then added to the mixture, which is stirred for about 1 minute to form the egg product mixture including corn fiber. The egg product mixture may be used immediately to prepare an egg-based product or may be refrigerated and/or frozen for later use.

A sensory evaluation was completed to compare an egg-based patty with corn fiber prepared according to this method to a control egg-based patty made by the same method but using a liquid egg product mixture that does not include corn fiber (as described in Table 5).

An informal panel (n=13) (note: this a different sensory panel than the sensory panel in Example 7, therefore the observations of the control egg-based patty are slightly different) sampled the control egg-based patty and the egg-based patty including corn fiber; observations are summarized in Table 8.

TABLE 8

Sensory Testing Results

| Attribute | Table 5 Control Formula Egg-Based Patty | Egg-Based Patty with Corn Fiber |
|---|---|---|
| Texture | Moist, soft, with small air cells | More resilience to the bite; internal texture is more open with larger air cells (fluffy texture); no excess water |
| Flavor | Mild egg flavor | Mild egg flavor |
| Appearance | Rich yellow color; small air cells are visible; flat; even patty top surface | Rich yellow color; air cells of varied size are visible; patties have slightly uneven top surfaces due to larger air cell development |
| Average Patty Height (mm) | 7.17 | 8.15 |

It was surprising that the product with added corn fiber improved the overall appearance of the egg-based patty by increasing the overall height of the egg-based patty. In addition, the appearance and the texture of the egg-based patty was more fluffy due to the increase in size of the air cells. In the various formulations, when Fibersol-2 soluble corn fiber is added at levels between 1 and 2 wt % of the total mixture, the patty height increases 10-15%.

Example 9

Preparation of a Liquid Egg Product Mixture Including Carrot Fiber

An egg product mixture including carrot fiber is prepared with the ingredients detailed in Table 9.

TABLE 9

Liquid Egg Product Mixture Including Carrot Fiber Ingredients

| Ingredient | Ingredient (wt %) | Ingredient Amount (g) |
|---|---|---|
| Whole egg | 56.7800% | 1,287,748 |
| Water | 37.1000% | 841,413.2 |
| HYDROBIND carrot fiber (LP) | 0.3600% | 8,164.656 |
| POLARTEX 06738 | 2.0000% | 45,359.2 |
| Soybean oil | 2.5000% | 56,699 |
| Sodium chloride | 0.8000% | 18,143.68 |
| Citric acid | 0.1099% | 2,492.488 |
| Xanthan gum | 0.3500% | 7,937.86 |
| Total | 100.00% | 2,267,960 |

Whole egg (721,138.88 g) and water (841,413.2 g) are added to the mixing chamber of a Model LDT 600 gallon mixer (Breddo Likwifier Division of Caravan Ingredients, Kansas City, Mo., USA).

HYDROBIND carrot fiber (LP) (8,164.656 g), POLARTEX 06738 (45,359.2 g), soybean oil (56,699 g), sodium chloride (18,143.68 g), citric acid (2492.488 g), and xanthan gum (7,937.86 g) are combined in a container. The combined ingredients are added with stirring to the whole egg/water mixture.

The remaining quantity of whole egg is then added to the mixture, which is stirred for about 1 minute to form the egg product mixture including carrot fiber. The egg product mixture may be used immediately to prepare an egg-based product or may be refrigerated and/or frozen for later use.

Example 10

Preparation of a Liquid Egg Product Mixture Including Carrot Fiber

An egg product mixture including carrot fiber is prepared with the ingredients detailed in Table 10.

TABLE 10

Liquid Egg Product Mixture Including Carrot Fiber Ingredients

| Ingredient | Ingredient (wt %) | Ingredient Amount (g) |
|---|---|---|
| Whole egg | 56.7300% | 1,286,614 |
| Water | 37.1000% | 841,413.2 |
| HYDROBIND carrot fiber (LP) | 0.3600% | 8,164.656 |
| POLARTEX 06738 | 2.0000% | 45,359.2 |
| Soybean oil | 2.5000% | 56,699 |
| Sodium chloride | 0.8000% | 18,143.68 |
| Citric acid | 0.1099% | 2492.488 |
| VISCOGUM FA locust bean gum | 0.2000% | 4,535.92 |
| Xanthan gum | 0.2000% | 4,535.92 |
| Total | 100.00% | 2,267,960 |

Whole egg (720,504 g) and water (841,413.2 g) are added to the mixing chamber of a Model LDT 600 gallon mixer (Breddo Likwifier Division of Caravan Ingredients, Kansas City, Mo., USA).

HYDROBIND carrot fiber (LP) (8,164.656 g), POLARTEX 06738 (45,359.2 g), soybean oil (56,699 g), sodium chloride (18,143.68 g), citric acid (2492.488 g), VISCOGUM FA locust bean gum (4,535.92 g), and xanthan gum (4,535.92 g) are combined in a container. The combined ingredients are added with stirring to the whole egg/water mixture.

The remaining quantity of whole egg is then added to the mixture, which is stirred for about 1 minute to form the egg product mixture including carrot fiber. The egg product mixture may be used immediately to prepare an egg-based product or may be refrigerated and/or frozen for later use.

Example 11

Preparation of a Liquid Egg Product Mixture Including Carrot Fiber

An egg product mixture including carrot fiber is prepared with the ingredients detailed in Table 11.

TABLE 11

Liquid Egg Product Mixture Including Carrot Fiber Ingredients

| Ingredient | Ingredient (wt %) | Ingredient Amount (g) |
| --- | --- | --- |
| Whole egg | 56.4800% | 1,303,623 |
| Water | 37.1000% | 841,413.2 |
| HYDROBIND carrot fiber (LP) | 0.3600% | 8,164.656 |
| AUBYGEL RPS carrageenan | 0.5000% | 11,339.8 |
| POLARTEX 06738 | 0.8% | 18,143.68 |
| Soybean oil | 2.5000% | 56,699 |
| Sodium chloride | 0.8000% | 18,143.68 |
| Citric acid | 0.1099% | 2,492.488 |
| Xanthan gum | 0.3500% | 7,937.86 |
| Total | 100.00% | 2,267,960 |

Whole egg (730,029 g) and water (841,413.2 g) are added to the mixing chamber of a Model LDT 600 gallon mixer (Breddo Likwifier Division of Caravan Ingredients, Kansas City, Mo., USA).

HYDROBIND carrot fiber (LP) (8,164.656 g), AUBYGEL RPS carrageenan (11,339.8), POLARTEX 06738 (18,143.68 g), soybean oil (56,699 g), sodium chloride (18,143.68 g), citric acid (2,492.488 g), and xanthan gum (7,937.86 g) are combined in a container. The combined ingredients are added with stirring to the whole egg/water mixture.

The remaining quantity of whole egg is then added to the mixture, which is stirred for about 1 minute to form the egg product mixture including carrot fiber. The egg product mixture may be used immediately to prepare an egg-based product or may be refrigerated and/or frozen for later use.

Example 12

Preparation of a Liquid Egg Product Mixture Including Carrot Fiber

An egg product mixture including carrot fiber is prepared with the ingredients detailed in Table 12.

TABLE 12

Liquid Egg Product Mixture Including Carrot Fiber Ingredients

| Ingredient | Ingredient (wt %) | Ingredient Amount (g) |
| --- | --- | --- |
| Whole egg | 51.7800% | 1,174,350 |
| Water | 37.1000% | 841,413.2 |
| HYDROBIND carrot fiber (LP) | 0.3600% | 8,164.656 |
| PROLIA defatted soy flour | 5% | 11,339.8 |
| POLARTEX 06738 | 2.0000% | 45,359.2 |
| Soybean oil | 2.5000% | 56,699 |
| Sodium chloride | 0.8000% | 18,143.68 |
| Citric acid | 0.1099% | 2,492.488 |
| Xanthan gum | 0.3500% | 7,937.86 |
| Total | 100.00% | 2,267,960 |

Whole egg (657,636 g) and water (841,413.2 g) are added to the mixing chamber of a Model LDT 600 gallon mixer (Breddo Likwifier Division of Caravan Ingredients, Kansas City, Mo., USA).

HYDROBIND carrot fiber (LP) (8,164.656 g), PROLIA defatted soy flour (11,339.8 g), POLARTEX 06738 (45,359.2 g), soybean oil (56,699 g), sodium chloride (18,143.68 g), citric acid (2,492.488 g), and xanthan gum (7,937.86 g) are combined in a container. The combined ingredients are added with stirring to the whole egg/water mixture.

The remaining quantity of whole egg is then added to the mixture, which is stirred for about 1 minute to form the egg product mixture including carrot fiber. The egg product mixture may be used immediately to prepare an egg-based product or may be refrigerated and/or frozen for later use.

Example 13

Preparation of a Liquid Egg Product Mixture Including Carrot Fiber

An egg product mixture including carrot fiber is prepared with the ingredients detailed in Table 13.

TABLE 13

Liquid Egg Product Mixture Including Carrot Fiber Ingredients

| Ingredient | Ingredient (wt %) | Ingredient Amount (g) |
| --- | --- | --- |
| Whole egg | 53.2800% | 1,208,369 |
| Water | 37.1000% | 841,413.2 |
| HYDROBIND carrot fiber (LP) | 0.3600% | 8,164.656 |
| Dried egg whites | 1.0000% | 22,679.6 |
| SUPRA soy protein isolate | 2.5000% | 56,699 |
| POLARTEX 06738 | 2.0000% | 45,359.2 |
| Soybean oil | 2.5000% | 56,699 |
| Sodium chloride | 0.8000% | 18,143.68 |
| Citric acid | 0.1099% | 2,492.488 |
| Xanthan gum | 0.3500% | 7,937.86 |
| Total | 100.00% | 2,267,960 |

Whole egg (676,687 g) and water (841,413.2 g) are added to the mixing chamber of a Model LDT 600 gallon mixer (Breddo Likwifier Division of Caravan Ingredients, Kansas City, Mo., USA).

HYDROBIND carrot fiber (LP) (8,164.656 g), dried egg whites (22,679.6.8 g), SUPRA soy protein isolate (56,699 g), POLARTEX 06738 (45,359.2 g), soybean oil (56,699 g), sodium chloride (18,143.68 g), citric acid (2,492.488 g), and xanthan gum (7,937.86 g) are combined in a container. The combined ingredients are added with stirring to the whole egg/water mixture.

The remaining quantity of whole egg is then added to the mixture, which is stirred for about 1 minute to form the egg product mixture including carrot fiber. The egg product mixture may be used immediately to prepare an egg-based product or may be refrigerated and/or frozen for later use.

Example 14

Egg-Based Extruded Product Prepared with Egg Product Mixture Including Plant Fiber Egg product mixture including plant fiber, prepared as described in Examples 8-12, at a temperature of about 40° F. is pumped by a positive displacement pump through a water-jacketed tube in a tube pre-heater and brought to a temperature of about 140° F. The preheated egg product mixture including plant fiber is then pumped by means of a positive displacement pump into a scraped surface heat exchanger ("SSHE"). The dasher contained within the barrel is operated at about 270 rpm. Hot water is circulated in the jacket of the SSHE barrel and heat is indirectly transferred to the material contained within the barrel.

As the egg product mixture including plant fiber exits the SSHE at a temperature of about 170° F., it immediately enters one branch of a hold tube. After a period of about five minutes, a rotating valve opens to a second 100-foot branch of the holding tube and product is forced into this section of the hold tube. The proteins contained within the egg product mixture including plant fiber are denatured and coagulation occurs within the hold tube. For a period of five minutes the heated egg product mixture including plant fiber is left undisturbed. At the exit of the hold tube, the fully-cooked egg product is forced through an extrusion plate to form an egg-based extruded product.

Example 15

Egg-Based Extruded Product Including Plant Fiber Freezing/Cooling Process

The egg-based extruded product, prepared as described in Example 13, may be placed in a mechanical freezer and cooled to about −20° F. to about 30° F. (−29° C. to about −1° C.) for about 15 to about 45 minutes before being packaged for storage and/or distribution.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a meat" includes two or more different meats. As used herein, the term "include" and its grammatical variants are intended to be non-limiting, such that recitation of items in a list is not to the exclusion of other like items that can be substituted or added to the listed items.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A liquid egg mixture for making an egg based product comprising:
   a liquid egg product, and
   a plant fiber that is carrot fiber having a water absorption capacity of at least 8 times its weight, the carrot fiber comprising at least 70% total dietary fiber with at least 12% soluble dietary fiber;
   wherein the liquid egg mixture comprises
   from about 40 wt % and 99 wt % whole egg, and
   from about 0.001 wt % to about 2 wt % of the carrot fiber.

2. The liquid egg mixture of claim 1, wherein the carrot fiber comprises about 0.0015 wt % to about 1.5 wt % of the total mixture weight.

3. The liquid egg mixture of claim 1, wherein the carrot fiber comprises about 0.002 wt % to about 1.0 wt % of the total mixture weight.

4. The liquid egg mixture of claim 1, wherein the liquid egg product further comprises a liquid component selected from liquid egg white, liquid egg yolk, liquid egg substitute, reconstituted egg powder, and combinations thereof.

5. The liquid egg mixture of claim 1, wherein the liquid egg product further comprises a liquid component selected from egg whites, egg yolks, and combinations thereof.

6. The liquid egg mixture of claim 1, wherein the liquid egg product is liquid whole egg.

7. The liquid egg mixture of claim 1, wherein the liquid egg mixture comprises an additive selected from the group consisting of at least one of water, dairy substances, oil, starch, gums, hydrocolloids, dried egg fractions, flavorants, spices, salts, organic acids, and coloring agents.

8. The liquid egg mixture of claim 7, wherein the additive is selected from the group consisting of at least one of water, a starch, an oil, a flavoring, a dairy substance, a salt, an organic acid, a gum, and a coloring agent.

9. The liquid egg mixture of claim 1, wherein the liquid egg mixture comprises
   from about 40 wt % and 99 wt % whole egg,
   up to about 55 wt % water,
   up to about 4 wt % powdered whole milk,
   up to about 10 wt % soybean oil,
   up to about 4 wt % starch,
   up to about 2 wt % salt/spices,
   up to about 1 wt % xanthan gum, and
   up to about 1 wt % citric acid.

10. The liquid egg mixture of claim 1, wherein the liquid egg mixture comprises
    from about 50 wt % and 99 wt % whole egg,
    up to about 45 wt % water,
    up to about 2 wt % powdered whole milk, up to about 3 wt % soybean oil,
up to about 3 wt % starch,
up to about 5 wt % soy flour protein,
up to about 5 wt % soy protein isolate,
up to about 5 wt % dried egg whites,
up to about 0.5 wt % carrageenan,
up to about 1 wt % salt,
up to about 0.5 wt % xanthan gum,
up to about 0.5 wt % locust bean gum, and
up to about 0.5 wt % citric acid.

11. The liquid egg mixture of claim 1, wherein the liquid egg mixture comprises
from about 63 wt % and 75 wt % whole egg,
from about 15 wt % to about 30 wt % water,
up to about 3 wt % nonfat dried milk,
up to about 3 wt % modified starch,
up to about 3 wt % soybean oil,
up to about 2 wt % spices,
up to about 1 wt % citric acid, and
up to about 1 wt % xanthan gum.

12. The liquid egg mixture of claim 1, wherein the liquid egg mixture is packaged and frozen for later use.

13. A method of preparing an egg-based patty comprising,
providing the liquid egg mixture of claim 1, and
heating the liquid egg mixture to form an egg-based patty.

14. The method of claim 13, comprising combining one or more non-egg food materials selected from the group consisting of cheese, meats and vegetables with the liquid egg mixture prior to cooking.

15. A method of preparing an egg-based extruded product comprising,
providing the liquid egg mixture of claim 1, and
heating the liquid egg mixture to form an egg-based extruded product.

16. The method of claim 15, comprising combining one or more non-egg food materials selected from the group consisting of cheese, meats and vegetables with the liquid egg mixture prior to cooking.

17. A frozen egg-based patty prepared from the composition of claim 1.

18. A frozen egg-based extruded product prepared from the composition of claim 1.

* * * * *

UNITED STATES PATENT AND TRADEMARK OFFICE
CERTIFICATE OF CORRECTION

PATENT NO. : 9,913,488 B2  
APPLICATION NO. : 14/763254  
DATED : March 13, 2018  
INVENTOR(S) : Nali Marie Prchal Book et al.

Page 1 of 1

It is certified that error appears in the above-identified patent and that said Letters Patent is hereby corrected as shown below:

On the Title Page

In item (60), under "Related U.S. Application Data", delete "61/791,400," and insert -- 61/761,400, --, therefor.

In the Specification

In Column 2, Line 50, delete "flee" and insert -- free --, therefor.

Signed and Sealed this
Eighteenth Day of September, 2018

Andrei Iancu
*Director of the United States Patent and Trademark Office*